United States Patent
Suzuki

(10) Patent No.: US 7,443,641 B2
(45) Date of Patent: Oct. 28, 2008

(54) DC-DC CONVERTER INCLUDING SHORT-CIRCUIT PROTECTION CIRCUIT

(75) Inventor: Teruo Suzuki, Chiba (JP)

(73) Assignee: Seiko Instruments Inc., Chiba (JP)

( * ) Notice: Subject to any disclaimer, the term of this patent is extended or adjusted under 35 U.S.C. 154(b) by 76 days.

(21) Appl. No.: 11/521,676

(22) Filed: Sep. 14, 2006

(65) Prior Publication Data
US 2007/0064455 A1    Mar. 22, 2007

(30) Foreign Application Priority Data
Sep. 20, 2005    (JP)    ............................. 2005-271359

(51) Int. Cl.
*H02H 3/24*    (2006.01)
(52) U.S. Cl. .......................................... 361/18; 361/92
(58) Field of Classification Search .................. 361/18, 361/92; 323/207, 282; 363/15, 21, 21.12, 363/34
See application file for complete search history.

(56) References Cited
U.S. PATENT DOCUMENTS 7,098,639 B2 * 8/2006 Natsume et al. ............. 323/282
7,310,251 B2 * 12/2007 Yang et al. ................. 363/56.09
2006/0076941 A1 * 4/2006 Ishii ........................... 323/282
2006/0152874 A1 * 7/2006 Young ........................ 361/93.1

FOREIGN PATENT DOCUMENTS

JP    2004-040858        2/2004
JP    2004040858 A *    2/2004

* cited by examiner

*Primary Examiner*—Stephen W Jackson
*Assistant Examiner*—Danny Nguyen
(74) *Attorney, Agent, or Firm*—Brinks Hofer Gilson & Lione

(57) ABSTRACT

Provided is a DC-DC converter including a short-circuit protection circuit which can stably perform a reset operation and a stop operation. The short-circuit protection circuit includes a detection circuit, a delay circuit, and a latch circuit. The delay circuit is reset in response to an output voltage abnormality signal related to a switching regulator which is outputted from the latch circuit. The latch circuit is reset based on an AND operation between the output voltage abnormality signal and a UVLO signal.

7 Claims, 2 Drawing Sheets

DC-DC CONVERTER INCLUDING SHORT-CIRCUIT PROTECTION CIRCUIT

This application claims priority under 35 U.S.C. §119 to Japanese Patent Application No. JP2005-271359 filed Sep. 20, 2005, the entire content of which is hereby incorporated by reference.

BACKGROUND OF THE INVENTION

1. Field of the Invention

The present invention relates to a DC-DC converter, and more particularly, to a DC-DC converter including a short-circuit protection circuit for stopping a circuit operation when an output voltage abnormality such as a short circuit of an output terminal is detected.

2. Description of the Related Art

In a conventional DC-DC converter, a timer latch short-circuit protection circuit of output voltage detection type is normally provided (see, for example, JP 2004-040858 A).

FIG. 3 is a block diagram showing a step-up switching regulator which is an example of the DC-DC converter. While a switching transistor 35 is in an ON state, a current flows into an inductance 31 connected in series between an input power source terminal and an output voltage terminal to store energy therein. While the switching transistor 35 is in an OFF state, the energy stored in the inductance 31 is combined with an input power source voltage. The resultant voltage is rectified by a diode 32 and smoothed by an output capacitor 33 to become an output voltage. The output voltage is fed back to a switching regulator control circuit 36 by voltage dividing resistors 37 and 38. The switching transistor 35 is controlled by the switching regulator control circuit 36 such that the output voltage reaches a predetermined value.

FIG. 4 is a circuit diagram showing a conventional timer latch short-circuit protection circuit provided in the switching regulator control circuit 36. The timer latch short-circuit protection circuit includes a detection circuit 41, a delay circuit 42, and a latch circuit 43. The detection circuit 41 compares a feedback voltage Vfb separated from the output voltage with a reference voltage Vref1 generated by a reference voltage circuit to detect the presence or absence of abnormality of the output voltage and outputs an output abnormality detection signal based on a result obtained by detection. The delay circuit 42 delays the output abnormality detection signal by a predetermined time. The latch circuit 43 latches an output abnormality signal outputted from the delay circuit 42. The switching regulator control circuit 36 stops the switching operation in response to the output abnormality signal outputted from the timer latch short-circuit protection circuit.

When the abnormality of the output voltage is detected, the switching operation of the switching regulator control circuit 36 is stopped in response to the output from the latch circuit 43. After that, when a UVLO circuit detects a reduction in input voltage, the conventional timer latch short-circuit protection circuit is reset in response to a UVLO signal outputted therefrom. Here, assume that a voltage for generating a reset signal-1 for the detection circuit 41 and the delay circuit 42 is set to a value lower than a voltage (for example, UVLO voltage) for generating a reset signal-2 for the latch circuit 43. Therefore, even when the input power source voltage instantaneously reduces to the UVLO voltage or less to reset the latch circuit 43, in the case where the input power source voltage does not become lower than the generated voltage of the reset signal-1, the abnormality detection and delay operation are normally performed without resetting the detection circuit 41 and the delay circuit 42. Thus, the switching operation can be stopped.

In order to reset the detection circuit 41 and the delay circuit 42 in the conventional timer latch short-circuit protection circuit, it is necessary to reduce the input power source voltage to the voltage for generating the reset signal-2. However, a capacitor 34 having a large capacitance value necessary for stabilization is connected with a power source 30, so it takes a long time to reduce the input power source voltage to the voltage for generating the reset signal-2. Therefore, there is a problem in which the reset operation requires a long time.

SUMMARY OF THE INVENTION

Therefore, the present invention has been made to solve the above-mentioned conventional problem. Therefore, an object of the present invention is to shorten a time for a reset operation performed after abnormality detection.

A timer latch short-circuit protection circuit according to the present invention includes a detection circuit for detecting a presence or absence of abnormality of an output voltage and generating an output abnormality detection signal when the abnormality of the output voltage is detected, a delay circuit for delaying the output abnormality detection signal by a predetermined time, and a latch circuit for latching an output abnormality signal from the delay circuit. The delay circuit is reset in response to the output abnormality signal outputted from the latch circuit. The latch circuit is reset based on an AND operation between the output abnormality signal and a UVLO signal.

In the timer latch short-circuit protection circuit according to the present invention, even if an input power source voltage does not become lower than a UVLO voltage, the delay circuit is reset by the output abnormality signal outputted from the latch circuit. This allows reduction in the time for the reset operation performed after abnormality detection.

Further, the latch circuit is reset based on the AND operation between the output abnormality signal and the UVLO signal, which produces an effect of allowing the stable reset control to be performed.

DETAILED DESCRIPTION OF THE PREFERRED EMBODIMENT

Figure 1:
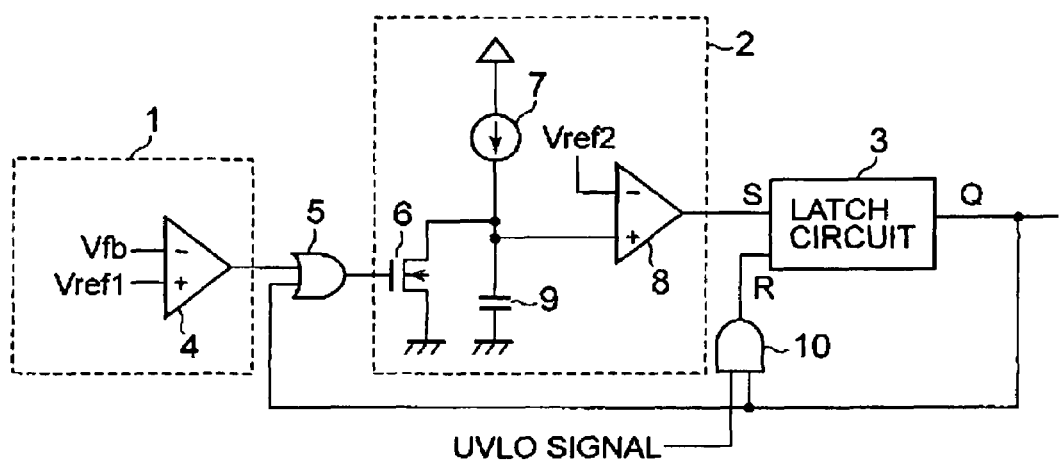
FIG. 1 is a circuit diagram showing a timer latch short-circuit protection circuit according to an embodiment of the present invention.

FIG. 1 shows a timer latch short-circuit protection circuit provided in the switching regulator control circuit 16 according to an embodiment of the present invention.

The timer latch short-circuit protection circuit according to the embodiment of the present invention includes a detection circuit 1, a delay circuit 2, and a latch circuit 3. The detection circuit 1 includes a comparator circuit 4 for comparing a feedback voltage Vfb from an output voltage with a reference voltage Vref1 to detect the presence or absence of abnormality of the output voltage. The delay circuit 2 delays an output abnormality detection signal outputted from the detection circuit 1 by a predetermined delay time. The latch circuit 3 latches an output abnormality signal outputted from the delay circuit 2.

The delay circuit 2 includes an NMOS transistor 6 having a gate to which the output abnormality detection signal is inputted, a capacitor 9 connected in parallel with the NMOS transistor 6, a constant current source 7 for charging the capacitor 9, and a comparator circuit 8 for comparing a voltage of the capacitor 9 with a reference voltage Vref2.

The output abnormality detection signal outputted from the comparator circuit 4 is inputted to the gate of the NMOS transistor 6 through an OR circuit 5. The NMOS transistor 6 is normally turned on, so the capacitor 9 is not charged. When the output abnormality detection signal is inputted to the NMOS transistor 6, the NMOS transistor 6 is turned off, so the capacitor 9 is charged by the constant current source 7. The delay time is set by using the constant current source 7 and the capacitor 9. The voltage of the charged capacitor 9 is compared with the reference voltage Vref2 by the comparator circuit 8. When the voltage of the capacitor 9 exceeds the reference voltage Vref2, the output abnormality signal is outputted from the comparator circuit 8. The output abnormality signal is inputted to a set terminal of the latch circuit 3. A switching regulator control circuit 16 stops the switching operation in response to the output abnormality signal outputted from the latch circuit 3.

In the timer latch short-circuit protection circuit according to the embodiment of the present invention, the output abnormality signal from the latch circuit 3 is fed back to also serve as a reset signal for the delay circuit 2. That is, when the output abnormality signal is outputted from the latch circuit 3, it is applied to the NMOS transistor 6 through the OR circuit 5 to turn on the NMOS transistor 6. Then, charges stored in the capacitor 9 are discharged to reset the delay circuit 2. Even when the delay circuit 2 is reset to initialize the set terminal of the latch circuit 3, the output of the latch circuit 3 is held. Therefore, the switching operation of the switching regulator control circuit 16 remains stopped.

A UVLO signal outputted when a reduction in input voltage is detected and the output abnormality signal from the latch circuit 3 are inputted to a reset terminal of the latch circuit 3 through an AND circuit 10. That is, the latch circuit 3 is reset only in a case where the UVLO signal and the output abnormality signal from the latch circuit 3 are detected.

As described above, according to the timer latch short-circuit protection circuit according to the embodiment of the present invention, the control is performed such that the delay circuit is reset immediately after the output abnormality is detected and the latch circuit is reset in response to the UVLO signal after the output abnormality signal is outputted. Therefore, stable reset control can be performed.

Figure 2:
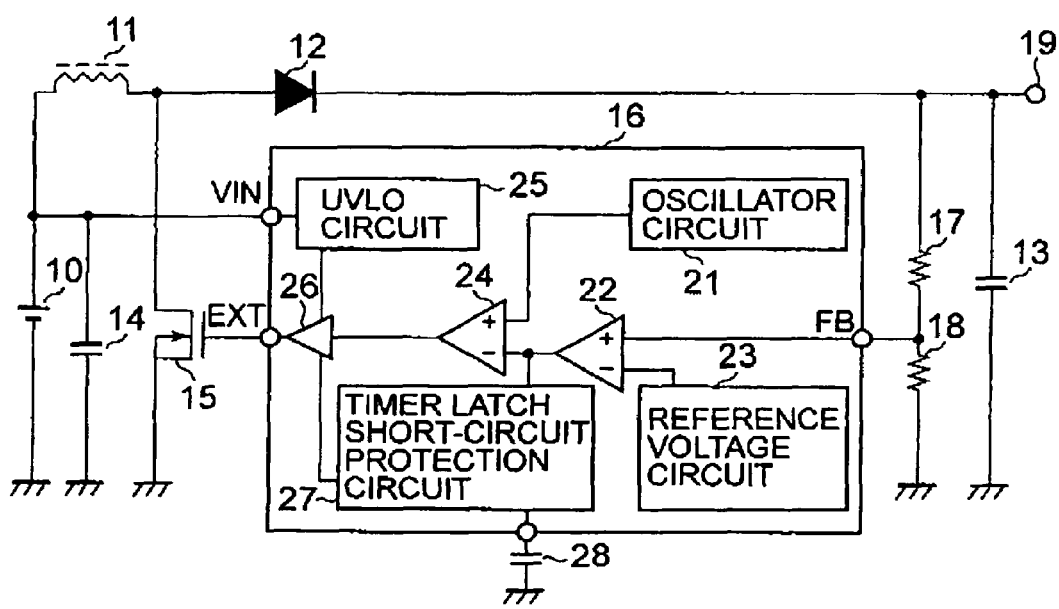
FIG. 2 is a circuit diagram showing an example of a switching regulator in which the timer latch short-circuit protection circuit according to the embodiment of the present invention is incorporated.
Figure 3:
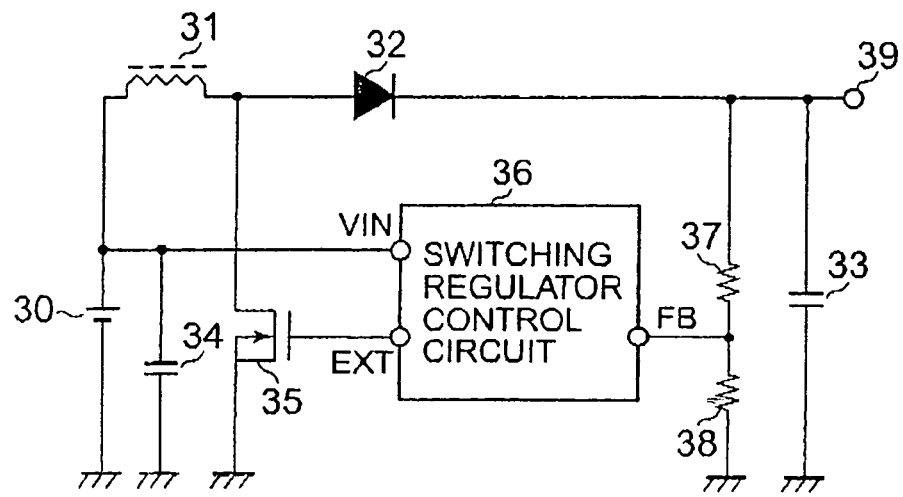
FIG. 3 is a block diagram showing a step-up switching regulator.
Figure 4:
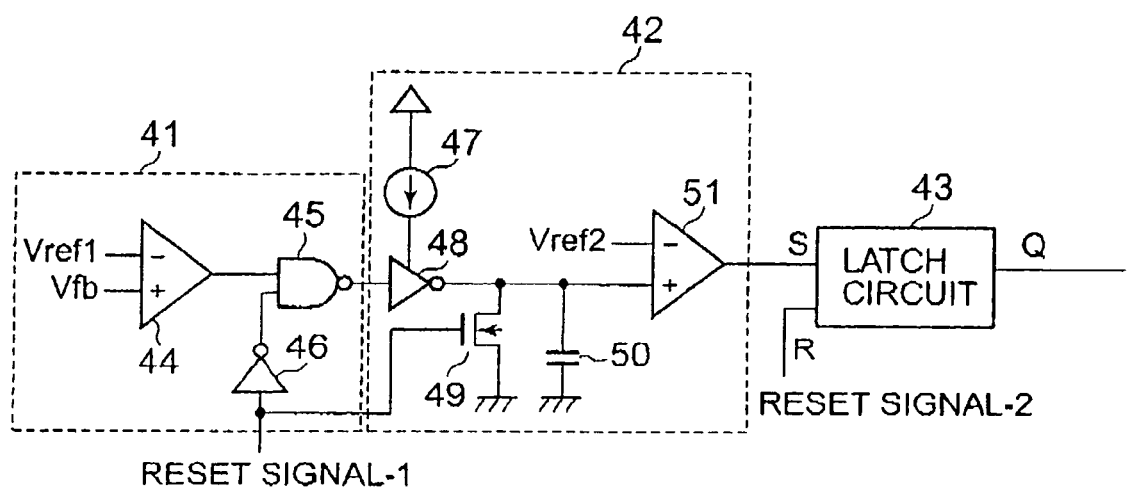
FIG. 4 is a circuit diagram showing a conventional timer latch short-circuit protection circuit.

FIG. 2 is a circuit diagram showing an example of a switching regulator in which a timer latch short-circuit protection circuit 27 is incorporated as the timer latch short-circuit protection circuit according to the embodiment of the present invention.

A divided voltage of a voltage dividing circuit composed of a resistor 17 and a resistor 18 is inputted to a terminal FB. An error amplifier circuit 22 compares the divided voltage with a reference voltage outputted from a reference voltage circuit 23 and outputs a voltage corresponding to a result obtained by the comparison. A PWM comparator 24 compares the output voltage of the error amplifier circuit 22 with a triangular wave outputted from an oscillator circuit 21. An output signal of the PWM comparator 24 is outputted from an EXT terminal through a buffer circuit 26. The EXT terminal is connected with a gate electrode of an NMOS transistor 15. A drain of the NMOS transistor 15 is connected with a connection point between an inductance 11 and a diode 12. A source of the NMOS transistor 15 is grounded.

When the output voltage is reduced by, for example, a short circuit of an output terminal, the divided voltage also reduces. Therefore, the timer latch short-circuit protection circuit 27 detects the output abnormality based on the output voltage of the error amplifier circuit 22 and outputs the output abnormality signal to the EXT terminal after the lapse of the delay time to stop the switching operation.

When the flow of overcurrent is caused by the short circuit of the output terminal to reduce an input power source voltage, a UVLO circuit 25 outputs the UVLO signal to the EXT terminal to stop the switching operation, so the input power source voltage increases. When the input power source voltage increases, the UVLO circuit 25 outputs a release signal to restart the switching operation, so the input power source voltage is reduced by the overcurrent generated by the short circuit of the output terminal. Therefore, even when the input power source voltage repeatedly increases and reduces and thus the UVLO signal is outputted, the timer latch short-circuit protection circuit 27 is not reset during a charging period of the capacitor 9. Thus, the delay circuit 2 continues to operate, so the switching operation can be stopped.

After that, unless the input power source voltage is reduced to output the UVLO signal for resetting the latch circuit 3, even when the switching operation is stopped to increase the input power source voltage, the switching operation is not started. Therefore, stable control can be performed.

What is claimed is:

1. A DC-DC converter, comprising a timer latch short-circuit protection circuit, including:
    a detection circuit for detecting a voltage of an output terminal and generating an output abnormality detection signal when the voltage of the output terminal reduces;
    a delay circuit for generating an output abnormality signal when the output abnormality detection signal is inputted thereto for at least a predetermined time; and
    a latch circuit for holding the output abnormality signal, wherein the delay circuit is reset in response to the output abnormality signal outputted from the latch circuit.

2. A DC-DC converter according to claim 1, wherein:
    the DC-DC converter further comprises a UVLO circuit for generating a UVLO signal when a reduction in input power source voltage is detected; and
    the latch circuit is reset based on an AND operation between the output abnormality signal and the UVLO signal.

3. A DC-DC converter according to claim 1, wherein the delay circuit includes:
    a constant current circuit and a capacitor which are connected in series between a power source terminal and a ground terminal;
    a switching element which is connected in parallel with the capacitor and controlled based on the output abnormality detection signal; and
    a comparator circuit for monitoring a voltage of the capacitor and generating the output abnormality signal when the monitored voltage reaches a predetermined voltage.

4. A DC-DC converter according to claim 3, wherein the switching element is controlled based on the output abnormality detection signal from the detection circuit to charge the capacitor and controlled based on the output abnormality signal from the latch circuit to discharge the capacitor.

5. A DC-DC converter, comprising:
- an inductance and a diode which are connected in series between an input power source terminal and an output voltage terminal;
- a voltage dividing circuit for generating a divided voltage of an output voltage of the output voltage terminal;
- a reference voltage circuit for generating a reference voltage;
- an error amplifier circuit for generating a voltage corresponding to a result obtained by comparison between the divided voltage from the voltage dividing circuit and the reference voltage;
- an oscillator circuit for generating a triangular wave;
- a PWM comparator for comparing the voltage generated from the error amplifier circuit with the triangular wave and generating a rectangular wave;
- a switching element connected between a connection portion between the inductance and the diode and a ground terminal;
- a detection circuit for detecting a presence or absence of abnormality of the voltage generated from the error amplifier circuit;
- a delay circuit for delaying an output signal from the detection circuit by a predetermined time; and
- a latch circuit for latching an output signal from the delay circuit, wherein the delay circuit is reset in response to the output signal from the latch circuit.

6. A DC-DC converter according to claim 5, further comprising a UVLO circuit, wherein the latch circuit is reset based on an AND operation between a UVLO signal outputted from the UVLO circuit when a reduction in input power source voltage is detected and the output signal from the latch circuit.

7. A DC-DC converter according to claim 5, wherein the delay circuit includes:
- a constant current circuit and a capacitor which are connected in series between the input power source terminal and a ground terminal;
- a switching element which is connected in parallel with the capacitor and controlled based on an output abnormality detection signal generated by the detection circuit when the presence of an abnormality of the voltage generated from the error amplifier circuit is detected; and
- a comparator circuit for monitoring a voltage of the capacitor and generating the output abnormality signal when the monitored voltage reaches a predetermined voltage.

* * * * *